DISTRIBUTED LINE CONCENTRATOR SYSTEM

Filed July 22, 1960 5 Sheets-Sheet 1

INVENTORS C. E. BROOKS
G. B. CROFUTT, JR.
W. C. SAND
BY S E Hollander
ATTORNEY

INVENTORS C. E. BROOKS
G. B. CROFUTT, JR.
W. C. SAND
BY S E Hollander
ATTORNEY

INVENTORS C. E. BROOKS
G. B. CROFUTT, JR.
W. C. SAND
BY S E Hollander
ATTORNEY

INVENTORS C. E. BROOKS
G. B. CROFUTT, JR.
W. C. SAND
BY S E Hollander
ATTORNEY

INVENTORS C. E. BROOKS
G. B. CROFUTT, JR.
W. C. SAND
BY S E Hollander
ATTORNEY

United States Patent Office 3,115,550
Patented Dec. 24, 1963

3,115,550

DISTRIBUTED LINE CONCENTRATOR SYSTEM

Chester E. Brooks, Montvale, George B. Crofutt, Jr., Verona, and William C. Sand, Chatham, N.J., assignors to Bell Telephone Laboratories, Incorporated, New York, N.Y., a corporation of New York Filed July 22, 1960, Ser. No. 44,760
25 Claims. (Cl. 179—18)

This invention relates to line concentrators and more particularly to apparatus for adapting existing central office equipment to operate with distributed line concentrators in which portions of the control and switching facilities are dispersed geographically and disposed in proximate relation to subscriber substations in lieu of centralization of switching and control facilities in a single location.

Recently, widespread interest has been evoked in the development of remote line concentrating facilities for use in the telephone plant. This interest has been generated largely as a result of a number of unique and important benefits derived from remote line concentration.

Remote line concentration may perhaps be best understood when viewed in the historical context which gave rise to its development.

"Concentration" of lines, per se, is at least as old as central offices. Thus, in a typical central office, the switching paths in the office are not provided on a per subscriber termination basis; traffic considerations do not warrant an arrangement of this kind which, moreover, would be of prohibitive cost.

Instead, conventional practice dictates the "concentration" of lines in the central office such that a relatively large number of subscriber lines have access to a smaller number of switching facilities. The "central office concentration" ratio is predicated on the quality of service to be provided under peak load conditions.

With regard specifically to remote line concentration, heretofore this type of arrangement comprehended the grouping of a number of subscriber lines at a remote locale in an arrangement analogous to the central office concentration. The lines are connectable on a shared basis to a lesser number of trunks which extend to a central telephone office. The ultimate goal, of course, is to obviate the necessity of providing a separate and independent channel for each telephone line directly to the central office.

A number of manifest benefits accrue from the concentration of the lines and the reduced number of trunks to the central office, particularly copper and other outside plant costs. However, as is often the case in the wake of each measurable advance in telephone switching technology, a number of new and substantial problems are generated.

Paramount among these problems is the fact that since the result of remote concentration is to deprive the individual substation of a completely independent channel to the central office, the supervision of the substation is rendered more difficult. This follows since the substation is now divorced from the conventional metallic electrical connection to the central office which, in the past, has provided a simple and reliable means (e.g., through a line relay) of discovering the supervisory condition of the substation, i.e., on-hook, off-hook, dialing, etc.

To meet the problem of supervision of the (electrically divorced) substation by the central office, various devices have been conceived although their common and fundamental purpose is to transcend the dissociation of the substation from its traditional bond to the central office.

These devices, although completely operative and useful for the purposes intended, in certain instances require continuous "dynamic" scanning of the substation line and continuous transmission of information gleaned from the scanning to the central office. In a number of cases, the sophistication and complexity of the scanning arrangements and the attendant costs thereof may measurably affect the savings achieved through line concentration.

Since one of the compelling factors in favor of line concentration at a remote locale is rooted in the economic benefits occasioned, it is apparent that the advantages thus obtained are at least partially neutralized if the concentrating facilities require additional expensive and complex units which are otherwise unnecessary in conventional direct line systems.

Perhaps one of the most telling disadvantages which applies in the conventional disposition of centralized remote line concentrator equipment is one which is so obvious that it may heretofore have been granted only passing consideration. It has always been necessary in conjunction with the use of remote line concentrator equipment when centralized at a remote locale to extend each of the subscriber lines to be concentrated to the centralized location where the remote line concentrator is physically disposed. The inexorable rule is that each line, regardless of distance from the concentrator, must be physically extended thereto in order to provide an operative arrangement.

But, in essence, it was the stringency of this very requirement (i.e., the rule that each line must be connected to the control equipment at a central location) that produced the reaction in switching technology in which remote line concentrators found their genesis.

The controlling and ultimate motivation for the use of line concentrators and the reason for the increasing interest in this area, as explained at the outset hereof, was produced by the attempt to avoid the inflexible requirement of connecting each line to the central office independently.

Thus, in overcoming the historical necessity of connecting each line to the central office, the philosophy heretofore employed was rather prosaic. In short, previous attempts were directed to providing a subsidiary or ancillary office, i.e., a remote line concentrator to which each of the lines would be connected and from which a lesser number of trunks would extend to the central office.

Examined in its historical perspective, this type of switching procedures is simply an extension of the concepts which gave rise to the creation of telephone central offices themselves. In fact, when viewed in the context which existed earlier in telephone switching technology (as explained supra), each telephone central office was a "concentrator" which precluded the necessity of extending a separate telephone channel from each subscriber to every other subscriber.

By the same rationale it is apparent that certain previous practices with regard to remote line concentrators are simply to provide another (remote) "central office" in microcosm.

Thus, by requiring the independent connection of each concentrator line to a centralized remote line concentrator, telephone switching technologists have been rigidly imposing a burden analogous to that which line concentrators are designed to overcome.

These disadvantages of prior line concentrator systems are obviated in the distributed line concentrator jointly described in the present specification and in application Serial No. 44,761, now Patent Number 3,070,666, filed on even date herewith, of Brooks-Crofutt-Henry, wherein the control and supervisory equipment are not centrally arranged but are dispersed proximate to the substation locations, thereby providing for minimal physical size of the individual switching and control facilities. In the distributed line concentrator system therein described it is unnecessary to independently connect each line to a centralized remote line concentrator. Accordingly, the distributed concentrator provides a line concentrator having switching and control facilities of unique simplicity.

Although the economic and other advantages manifest in the foregoing described concentrator are apparent, it itself gives rise to a number of problems related to its incorporation in the telephone plant. In fact, one of the most significant problems confronting telephone engineers is the manner in which a desirable but markedly different telephone switching apparatus may be adapted to work harmoniously with the existing telephone plant. Since the nature of the investment in the existing telephone plant may be reckoned in billions, it is crucial that the steps taken to incorporate new facilities in the plant provide for invasion or modification of existing equipment only to the extent realistically warranted after careful economic evaluation.

Viewed in this light, it is apparent that the manner in which a desirable structural innovation is applied to or incorporated in the telephone plant is of coordinate stature with the primary innovation, since the primary innovation itself cannot be exploited if it is economically incompatible with the existing telephone plant. In this sense, an applique circuit for combining the remote distributed line concentrator with existing central office equipment is subject to a number of rigorous qualifications. Thus, the applique circuit must provide facilities which are compatible with existing or conventional equipment and, at the same time, suitable for use in conjunction with the innovated arrangement. Considering the unique departures of the distributed remote line concentrator from certain prior equipments, an ararngement for coupling the concentrator to a conventional office need be extremely versatile in design, i.e., a flexible bridge between the old and new arts.

Moreover, the applique or combining circuit must be so constituted in achieving its desired function as to provide an absolute minimum of interference with the conventional central office equipment. In the ideal situation, the central office equipment, despite the connection of the applique circuit, should be unaware that the lines it is serving are other than the conventional direct connected lines. Moreover, as a practical necessity, all of these qualities must be inherent in the applique circuit without increasing the cost thereof to a point where it will override or neutralize the savings occasioned by the distributed concentrator circuit.

This problem is presented in sharpest relief when it is necessary to introduce the new approach in switching technology into a fairly rigidified, long established switching system such as the No. 1 crossbar telephone system, for example.

Moreover, the No. 1 crossbar system presents a particularly difficult problem for incorporating concentrator equipment, since the apparatus used in the system on an originating call is different from that used for a terminating call.

It is, therefore, an object of this invention to provide for the connection of a distributed concentrator system to an existing crossbar central office.

A number of prior art concentrator devices have presented a conventional format in which separate equipment was devoted to the function of identifying the calling subscriber's line and still other equipment was assigned the task of marking a subscriber's line or trunk for connection through a switching network to the central office.

These concentrators have, moreover, required still further equipment for effecting a release of the grid or network crosspoint after termination of a connection.

The necessity for individual (and often intricate) equipment for performing the above-referred-to functions is overcome in the present invention in which all of these functions are performed by a single apparatus. Thus, the line identifier of the present invention is adapted to perform an identifying function on originating and terminating calls and, moreover, is capable of governing marking operations on originating and terminating calls.

It is, therefore, an object of this invention to provide applique equipment for connecting a concentrator to a telephone central office wherein minimal modifications of the office equipment are required.

A further object of this invention is to provide for combined operation of a concentrator system with a telephone central office without substantially altering the normal operation of the telephone office equipment.

Still another object of this invention is to provide individual relay units at the telephone central office unique to each of the substations connected to the concentrator.

A further object of this invention is to provide for trunk identifying facilities at the central office unique to each trunk extending to the concentrator.

An additional object of this invention is to provide for translation on terminating calls to a subscriber connected to the telephone concentrator to permit code marking of number group conductors extending to the subscriber's substation.

A further object of this invention is to provide for the connection of a distributed concentrator to a conventional telephone central office in a manner which does not require the conventional office equipment to distinguish a call from a concentrator line from a call on a direct line.

In a number of prior art concentrator units, the circuitry employed did not contemplate the possibility of connecting a plurality of subscribers in "chain" formation along the same trunk. Instead the "lockout" tradition of telephone switching precluded connecting a subscriber to an occupied trunk.

For the same reason it was not possible to connect the central office to a plurality of substations connected in chain formation along the same trunk to permit "broadcast" communication from the central office to all the subscribers simultaneously.

It is therefore an object of this invention to provide facilities for concurrently connecting a plurality of subscribers to the same speech trunk to permit voice communication among the subscribers.

An additional object of this invention is to provide facilities for connecting the central office to a plurality of substations connected to the same trunk to permit "broadcast" communication from said central office to said substations.

For similar reasons to that which precluded multiple connections of different subscribers to the same speech trunk it was not possible under previous arrangements to connect a plurality of code receiving units such as "Teletype" receivers concurrently to the same concentrator speech trunk.

It is therefore an object of this invention to provide facilities for enabling multiple connections of "Teletype" receivers to a single speech trunk to permit "broadcast" communication to said receivers from a "Teletype" transmitter at the central office.

These and other objects of the invention are accomplished in an illustrative embodiment in which an applique circuit is provided in a No. 1 crossbar office for a remote line concentrator which includes a plurality of separate line package or switching elements unique to individual substation lines and physically disposed at locations proximate to the individual substations. A plurality of coding or number group leads and a number group return lead are extended in the field to each of the lines or substations to be concentrated. In addition, an appropriate number of speech or communication trunks less in number than the number of substations are likewise extended in the field to each of the subscriber lines.

To provide access by a particular substation to the central office the line package individual to a substation line includes arrangements for connecting a line to a selected arrangement of number group leads in accordance with a code identifying the line. In addition, each line is directly connected to a number group return lead.

Crosspoints in the line package are arranged to connect the tip and ring conductors of the line to corresponding conductors of each of the speech trunks in response to control signals from the central office.

At the central office an applique circuit is provided which is connected to the horizontal levels of the crossbar switches of the first switching stage. Each of the concentrator lines is represented on the vertical of a crossbar switch in the usual No. 1 crossbar convention. The tip and ring conductors which ordinarily extend from the vertical to the subscriber substation are truncated, although the sleeve lead is connected in the usual manner for control purposes.

The circuitry is arranged in order that in an originating call an identification over the number group leads results in the operation of the usual line relay. Thereafter the crossbar office attempts to complete the call in the same manner utilized for a direct connected line.

Since the office does not necessarily "know" it is dealing with a concentrated line it proceeds to establish a connection over a horizontal link to the vertical representing the line requesting service.

In the instant arrangement since the concentrator speech trunks extending into the field are terminated at the horizontals of the crossbar switch, an attempt to effect a connection to the vertical of what the office believes to be the service requesting line extends a horizontal link to the vertical switch corresponding to the calling substation in the same manner as if the substation were actually connected to the office. When the horizontal link is energized, the applique circuit extends a connection over the horizontal link and the concentrator speech trunk to the remote location of the calling subscriber's line package. Crosspoints at the calling subscriber's line package are then automatically closed to effect a connection between the line loop and the selected trunk.

This procedure is accomplished over the number group leads by applying unique potentials to those leads to which the subscriber line package is connected. At the same time, marking potentials are applied to the selected trunk connected to the horizontal link. By virtue of the difference in potential, the crosspoints between the selected trunk and line are energized.

On a terminating call to a substation a substantially similar procedure is followed. In this respect the No. 1 crossbar office attempts to complete a connection to what it "believes" is the termination of the subscriber's line on the vertical of the crossbar switch. Again a connection is extended over the horizontal link and the trunk connected thereto to the subscriber's line package. Selection of a line relay unique to the called subscriber's line permits determination of the number group leads to which the called subscriber is connected. Energization of the crosspoints is effected in a manner similar to that described above.

Thus the horizontal levels of the crossbar switch are in effect extended into the field and substation lines which previously would have been connected to the vertical levels of the same switch in the central office are instead connected through line packages at varying physical locations. The operation of the crosspoints to effect the connection between the line and the horizontal link or trunk in the field is tantamount to the operation of the vertical switch in the central office in previous practice.

A feature of this invention includes applique facilities for connecting a distributed concentrator to a conventional telephone central office with minimal rearrangements of existing central office equipment.

Another feature of this invention includes arrangements for modifying existing central office equipment to actuate appropriate applique circuit facilities through normal operation of the common control equipment and without varying the normal operation of said equipment.

A further feature of this invention includes facilities for terminating concentrator speech trunks on the horizontal conductive paths of a crossbar switch.

Another feature of this invention provides for the omission of the conventional connection of the subscriber's line to the vertical paths of the crossbar switch in the central office.

Still another feature of this invention provides for the effective displacement of said vertical connection to a plurality of distinct and separated locations.

A further feature of this invention includes arrangements for providing a relay in each central office individual to each of the substations connected to the concentrator.

A further feature of this invention provides for operation of said relay unique to a substation in response to a calling condition at said substation although no direct electrical connection exists between said relay and said substation.

Thus in accordance with the above-mentioned features, in accordance with our invention, the conventional No. 1 cross bar or other system to which the distributed line concentrator is connected does not known whether the line being served is a concentrated line or a direct, i.e., conventional line into the office, as the concentrator speech trunks are connected to the horizontal levels on the usual primary crossbar switch of the line link frame. However a unique line relay and vertical termination is provided for each line. Since the concentrated lines do not, of course, reach the central office, the tip and ring conductors connected to the vertical on the crossbar switch are truncated, or may be omitted, while the sleeve lead, unique to each concentrator line, is used in the conventional manner for supervision. In essence this amounts to transferring the horizontal level of the crossbar switch to a remote field point contiguous to the subscriber while retaining the vertical level, and particularly the sleeve lead, in the central office.

A further feature of this invention includes facilities for repeating dial and supervisory signals from the remote substations.

Another feature of this invention includes arrangements for verifying successful closure and release of remote switching connections.

Still another feature of this invention includes specialized superimposed ringing facilities for operating low current "horn" type substation ringers.

A feature of this invention is an arrangement for sequentially marking the cross points of a plurality of substations to the same speech trunk to permit voice communication among the substations connected to the trunk.

An additional feature of this invention is an arrangement for transmitting voice signals from said central office in "broadcast" form to a plurality of substations connected to the same speech trunk.

A further feature of this invention includes facilities for simultaneously transmitting messages to a plurality of "Teletype" receivers connected to the same speech trunk.

A still further feature of this invention is transfer circuitry for alternatively coupling the number group leads extending from the central office to the concentrator packages either to detector circuits for identifying a concentrator substation in a signaling condition or to a terminating translator to energize the number group leads in response to a calling condition to one of the concentrator substations.

These and other objects and features of the invention may be more readily apprehended from an examination of the following specification, appended claims and attached drawing in which:

Figure 1A:
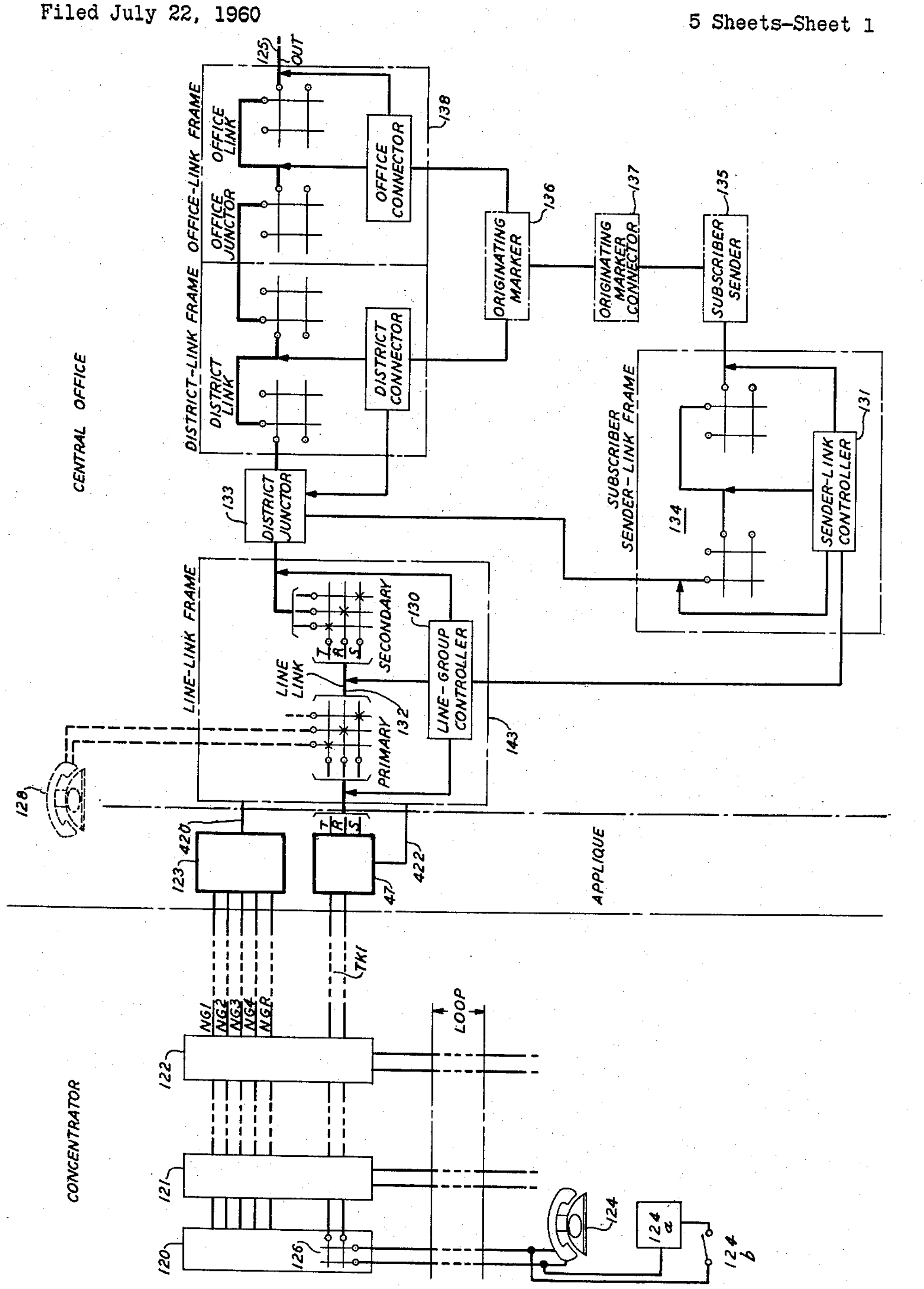
FIG. 1A shows a block diagram of the concentrator combination with a conventional No. 1 crossbar telephone office during the processing of a call originating at the remote concentrator.
Figure 1B:
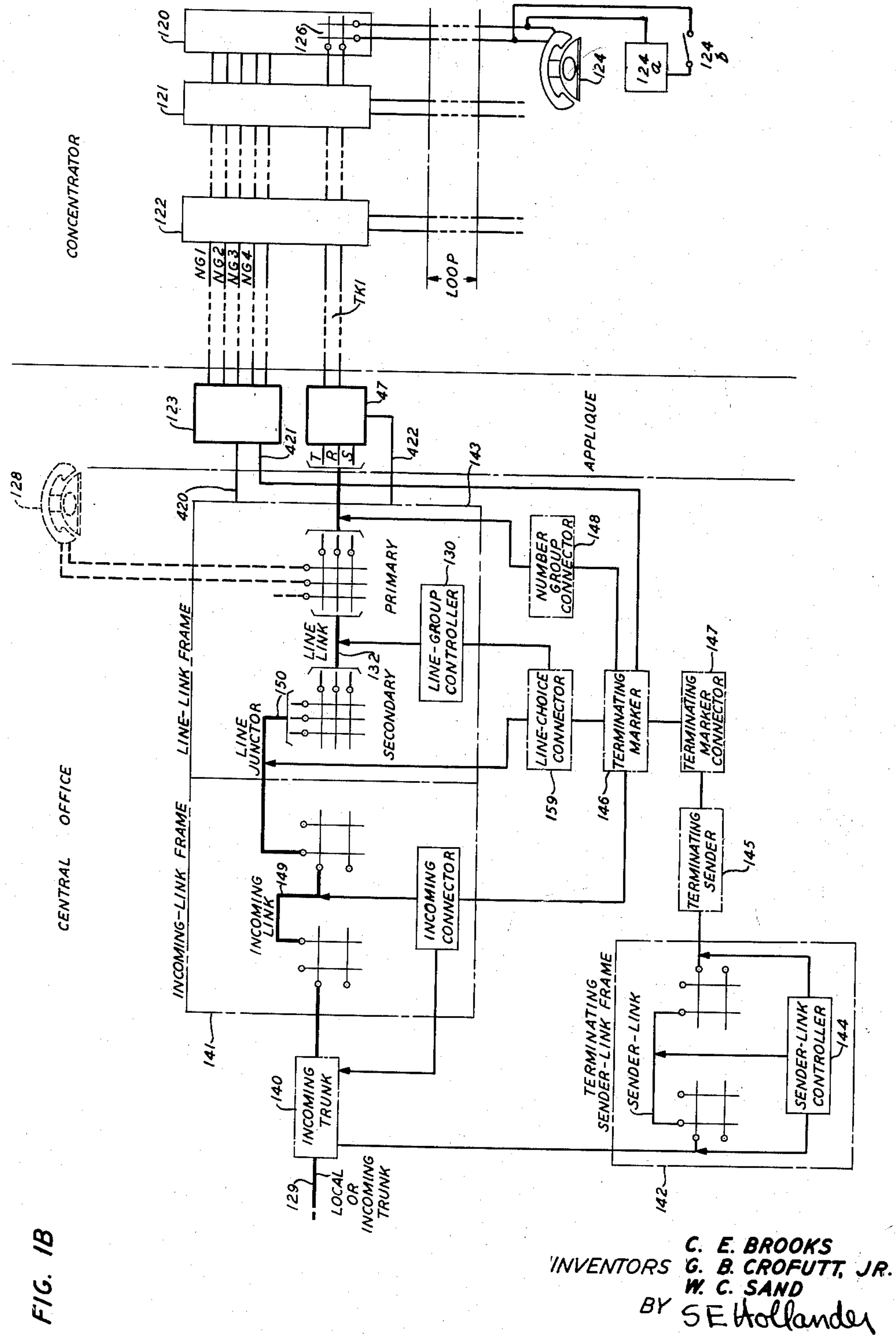
FIG. 1B illustrates a combined arrangement including the distributed concentrator and a No. 1 crossbar telephone office during the processing of a terminating call to one of the line packages.
Figure 2:
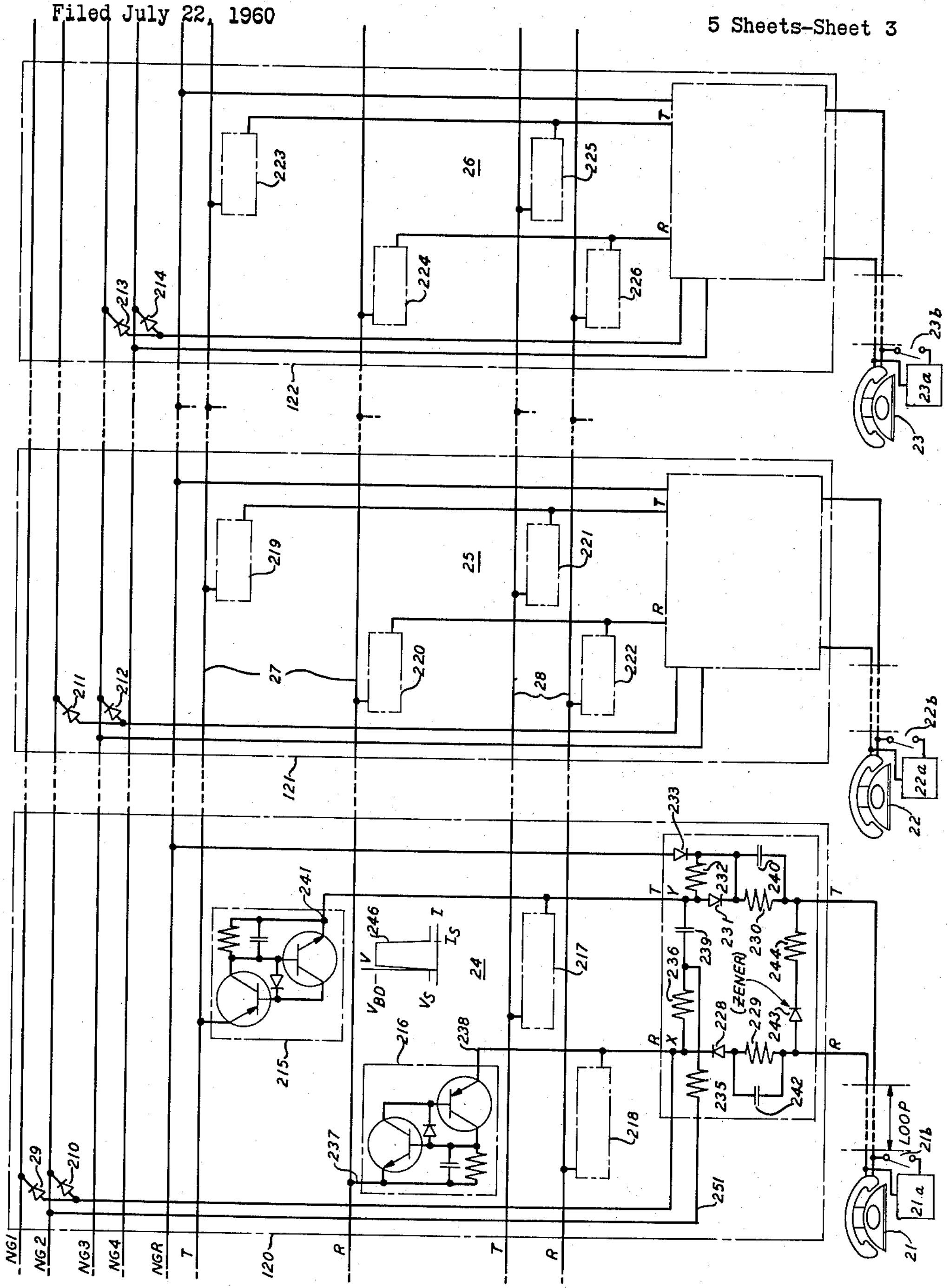
Figure 3:
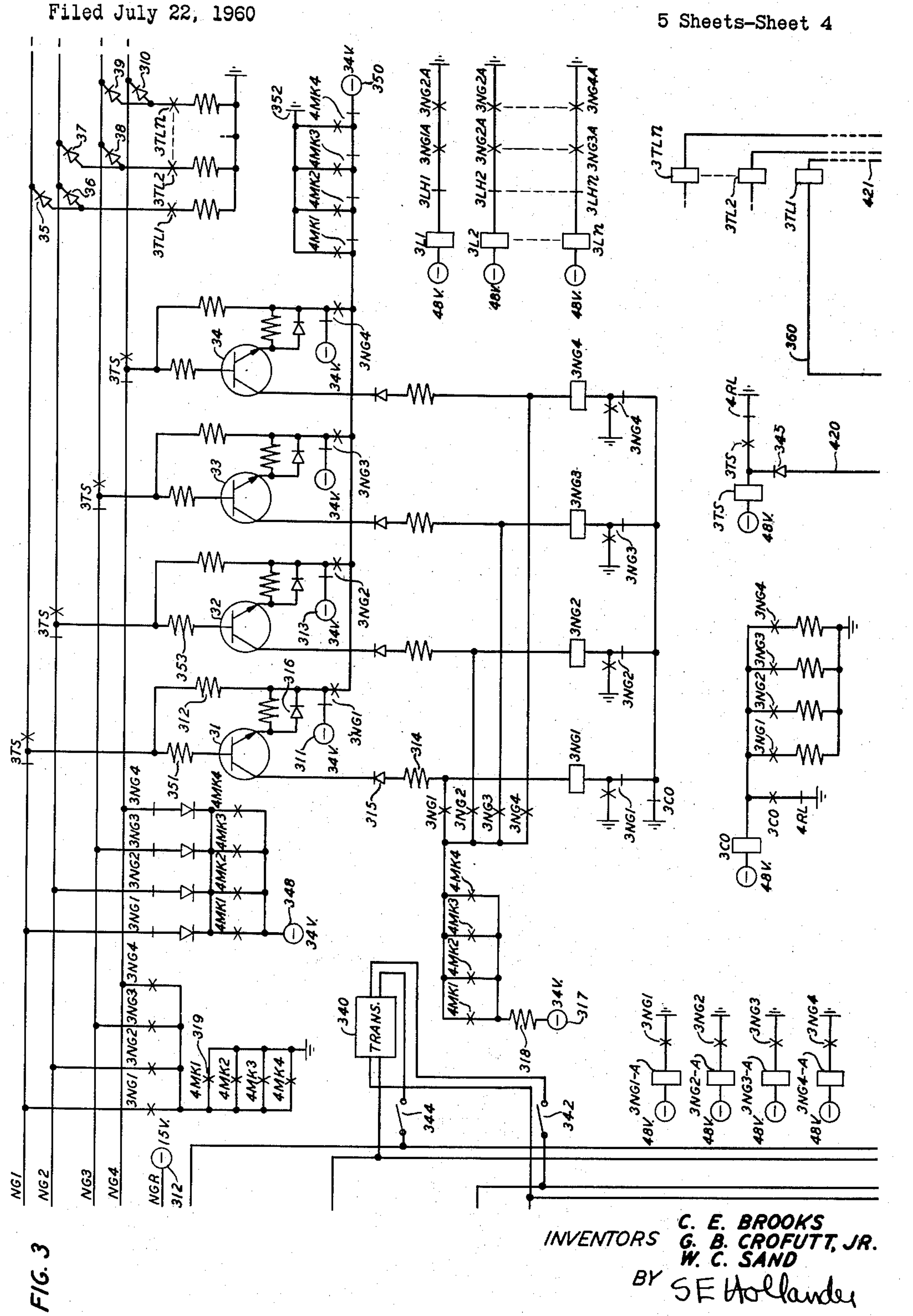
Figures 4, 5:
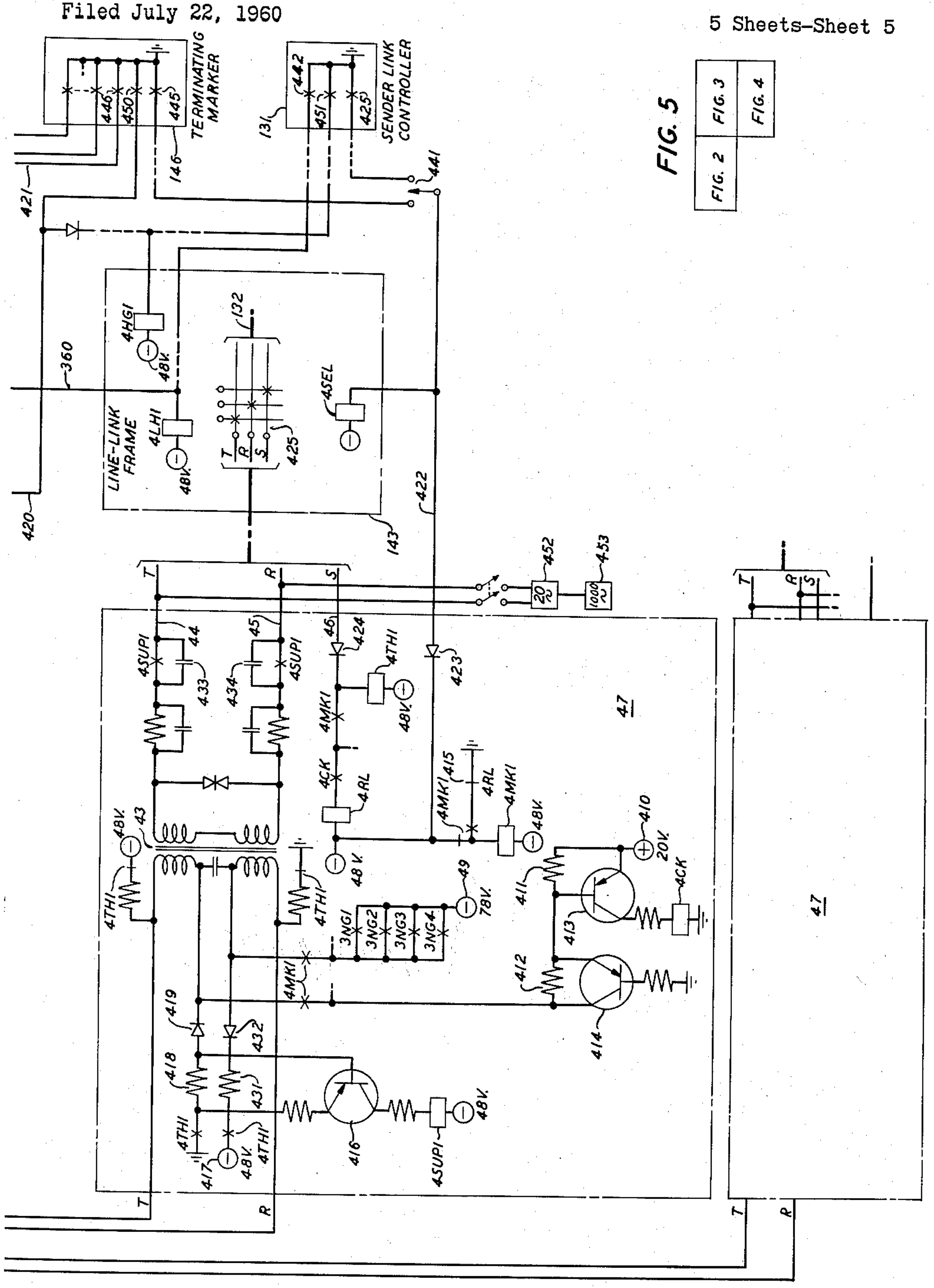

FIGS. 2–4 indicate the detailed structures of the equipment shown in outline form in FIGS. 1A and 1B wherein those structures have been added to or modified; and FIG. 5 depicts the advantageous arrangement of FIGS. 2–4 to disclose the present invention.

*General Description of Operation—Originating Call*

In accordance with an illustrative embodiment of the instant invention the distributed line concentrator control and supervisory arrangement disclosed in an application of Brooks-Crofutt-Henry, Serial No. 44,761, now Patent Number 3,070,666, filed on even date herewith, are shown incorporated by the applique facilities of our invention in a conventional No. 1 crossbar telephone system. To assist in fixing the perspective of the following detailed description it will be useful at the outset to briefly demonstrate the advantageous manner in which the distributed line concentrator is operated in combination with the No. 1 crossbar system.

Refering now to FIG. 1A, an outline diagram of the line concentrator apparatus as combined with the No. 1 crossbar office during the advent of an originating interoffice call from the concentrator is shown. More specifically a group of line packages 120–122 are shown each of which is connected to two of the four number group leads NG1–NG4 in accordance with a code described further herein. Moreover, each of the packages 120–122 is also connected to a common or return number group lead NGR.

A "Teletype" receiver 124*a* is connected in bridge with the substation loop as explained further herein.

A number of speech trunks, of which trunk TK1 is shown as representative, are also connected to each of the line packages. The number group leads terminate at the central office in an applique circuit 123 which is employed for identifying substations which are originating service requests and for other control operations explained further herein.

It is manifest from the drawing that trunk conductor TK1 is upon termination at the central office extended to the horizontal level of a primary crossbar switch in the line link frame.

For purposes of describing the operation of the invention in a general manner, it will be assumed that a party at substation 124 is seeking to effect a connection through the central office to a distant subscriber. When the substation 124 goes off-hook, current flows through particular number group leads connected through line package 120 to substation 124 as explained further herein. More specifically, current flows through the two number group leads NG1 and NG2 to which substation 124 will, for the purposes of the illustration, be assumed to be connected. In this respect it will be remembered that line packages 121 and 122 are each connected to other unique combinations of the number group leads NG1–NG4 to specifically identify them.

The current which flows in number group leads NG1 and NG2 as a result of the off-hook condition at substation 124 is detected at the central office in applique circuit 123 in a manner explained in detail herein and an identification of the calling substation is made through a translation of the number group leads carrying current.

As a result of the identification, a line relay (not shown in FIG. 1A but described below with reference to FIG. 3) is operated which is uniquely associated with the calling substation line.

In response to the operation of the line relay, the line group controller 130 and sender link controller 131 are energized. These controller circuits select an idle line link 132, district junctor 133, sender link 134 and sender 135 and operate necessary select and hold magnets to establish these connections. For a comprehensive description of the operation of this circuit, reference may be made to Patent No. 2,235,803 of W. W. Carpenter of March 18, 1941.

Simultaneously in response to the operation of the line relay, arrangements are made in circuit 123 to effect a connection to the substation by applying a marking potential to the number group leads NG1 and NG2 unique to that substation and by simultaneously applying a marking potential to the ring conductor of the selected trunk TK1. A crosspoint 126 is energized by the marking potentials as explained herein and a path is extended from substation 124 over the line loop to the line package 120, crosspoint 126, trunk conductor TK1, termination 47 at the central office to a horizontal multiple of the line link 132 on the line link frame 143 at the central office.

As soon as it is connected to the line, the subscriber sender 135 transmits dial tone to the calling subscriber and accepts and records the digits dialed at substation 124.

The subscriber sender 135 selects an idle originating marker 136 and passes the code of the called office and other necessary information to the marker through connector 137. The marker determines from the called office code the location of the corresponding trunk group on the output of the office link frame 138, locates a particular idle trunk 125 in the group and then determines idle paths through the district link and office link frames for connecting the district junctor 133 to the selected outgoing trunk 125. When these functions have been performed the marker operates the appropriate select and hold magnets to close the crosspoints and establish the connection to outgoing trunk 125.

The sender 135 then transmits the called line number to the terminating office and the connection is extended to the calling party.

Thus, it is apparent that substation 124 has been connected through the concentrator and No. 1 crossbar office to outgoing trunk 125 to complete the operation.

To demonstrate, for comparison, the manner in which a substation would have been connected to the line link frame in a conventional direct line connection, a line would extend as shown in dotted outline from the verticals on the line link frame to substation 128 which represents the prior art direct connected substation line.

In the present arrangement the tip and ring conductors on the verticals of the line link frame are of course omitted and instead the tip and ring horizontals (T and R) are extended out to the field and specifically to line package 120 over a speech trunk, for example TK1. The sleeve conductor on the line vertical is used to advantage in accordance with our invention in a number of control operations for the applique circuit 123 as explained further herein. But in over-all aspect it is apparent that the distributed line concentrator has in effect resulted in the displacement of the vertical paths on the primary switch of the line link frame to numerous distant and independent locations as shown for example at crosspoint 126.

*General Description of Operation—Terminating Call*

Having thus described the operation of the invention in processing an originating call, the manner of operation in handling an interoffice terminating call will be demonstrated. Referring now to FIG. 1B it will be assumed that a call is to be extended from the incoming trunk 129 which extends from a remote office through the No. 1 crossbar office equipment and the line concentrator to substation 124.

It will be noted that the incoming trunk 129 terminates in an incoming trunk circuit 140 which includes supervisory and ringing equipment. The incoming trunk circuits appear on the horizontals of the incoming link frame 141 as shown and also on the horizontals of the terminating sender link frame 142. The incoming link frame 141 and the line link frame 143 collectively form the terminating grid network for completing the call through the crossbar office.

The sender link controller circuit establishes a path from the incoming trunk circuit 140 to a terminating sender 145 through a crossbar link similar to that in which the line group controller circuit 130 discussed above operates. When the terminating sender 145 is connected to the incoming trunk circuit 140 it receives the called line number over an interoffice trunk from the originating office (over a local trunk if an intraoffice call) and when the complete number has been registered connects to a terminating marker 146 through a terminating marker connector 147.

The terminating sender 145 then transfers the record of the called substation number to the terminating marker 146 which in turn selects an idle path from the incoming trunk circuit 140 to the line link horizontal to which termination 47 is connected. The marker determines on which line link frame the line is located through the number group connector 148 and connects to the desired line link frame through the line choice connector 159. The originating office sender is released when the record of the called number has been passed to the terminating sender 145. The marker then makes a called line busy test as on a non-concentration call and if substation 124 is idle the marker extends the incoming trunk circuit through the incoming link 149, line junctor 150 and line link 132 to the horizontal on which trunk TK1 is terminated, equipment in terminating circuit 47 and applique circuit 123 are actuated to uniquely identify the number group leads associated with called substation 124 and to apply marking potentials to said number group leads and to the ring conductor of trunk TK1 to operate crosspoint 126. The incoming trunk applies ringing current to the called line and, when the call has been answered, maintains supervision.

Substation equipment 128 again shows in dotted outline the manner in which a substation would be connected to the line link frame 143 in accordance with prior art conventional practice thereby demonstrating the facility with which the horizontal level of the line link frame is in effect extended into the field where it appears at crosspoint 126 and numerous other physical locations. By energizing the crosspoint, as discussed above, it is possible to effect a connection to substation 124 in a manner analogous to that of the direct line connection.

Significantly, FIGS. 1A and 1B clearly indicate that by the circuitry of this invention there is a minimal invasion of conventional (existing) central office equipment necessary to incorporate the concentrator equipment.

For a complete explication of the operation of the equipment of FIG. 1B shown in "dot-dash" outline, reference may be made to Patent 2,089,921 of W. W. Carpenter of August 10, 1937.

*General Description of Major Components*

Referring now to FIG. 2 a group of substations 21, 22 and 23 and line "packages" 120, 121 and 122 are shown. Two trunks 27 and 28 are also shown. For purposes of clarity the number of substations and trunks have been minimized although the principles involved in the operation of a larger group of substations and trunks are identical.

Four number group leads NG1–NG4 extend from the central office of FIGS. 3 and 4 and are connected to each of the substations 21–23 in accordance with a prearranged code such that each package is connected to a unique set of number group leads over diodes 29, 210 and 211–214. A common number group or return lead NGR is connected to each of the packages.

Each of the substations is connectable to each of the trunks over a balanced path including transistor crosspoints 215–226, of which only transistor crosspoints 215 and 216 are shown in detail for clarity.

Each of the substations also includes connected in parallel therewith a code receiving unit which may illustratively be a "Teletype" receiver such as 21*a*, 22*a* and 23*a*. It is understood that the manner of connection of these units shown in outline form is such as to prevent interference with normal usage of the telephone instrument on both originating and terminating calls and that the "Teletype" receivers include isolating circuitry (e.g., switches 21*b*–23*b*) to prevent such interference. A "Teletype" transmitter 340 is shown in FIG. 3 which is connectable in shunt with the speech trunks as shown symbolically by switches 342 and 344. A further description of the operation of this equipment appears herein.

Thus substation 21 has access to trunk 27 over crosspoints 215 and 216 and access to trunk 28 over crosspoints 217 and 218. The loop of the substation 21 is connected to the crosspoints through a group of control diodes, resistors and capacitors shown in detail for substation 21, the function of which will be described in further detail herein.

It is significant to appreciate that each of the substation line packages 120–122 is illustratively removed from each other by substantial physical distances as indicated symbolically by the broken lines in the number group leads and speech trunks between the line packages. In this sense, package 120 which is in effect a portion of the remote control equipment and switching equipment for the concentrator individual to substation 21 is advantageously physically disposed at a location which is closest in contiguity to that substation.

It will be noted that each of the trunks 27 and 28 extend through locations contiguous to each of the substations 21–23 and also to the central office as indicated in FIGS. 3 and 4. More specifically, it may be seen that trunk 27 is terminated at the central office by transformer coupling through transformer 43 to conductors 44 and 45 which in turn extend with control lead 46 to a horizontal level 425 of a crossbar switch in the line link frame on which trunk 27 is terminated as shown in outline form in FIG. 1A for trunk TK1.

Trunk 28 is terminated in a similar manner and the details of the termination 47 are omitted to preserve clarity.

In order to determine the identity of a line which is requesting service, number group detectors 31–34 are provided. These transistor detectors are responsive to current flow in number group leads NG1–NG4, respectively, to operate the corresponding relays 3NG1–3NG4 of FIG. 3.

In addition, a group of coding diodes shown at 35–39 and 310 are used to mark the corresponding number group leads for terminating calls.

A group of individual line relays unique to each line are shown at relays 3L1–3L*n* of which only three relays are shown for clarity. It will be assumed herein that relay 3L1 uniquely corresponds to substation 21, relay 3L2 to substation 22 and relay 3L*n* to substation 23 of FIG. 2.

Having thus described in a general manner the operation and equipment incorporated in applicants' invention, illustrations of typical operating patterns will follow.

*Detailed Description—Originating Calls*

For purposes of illustration it will be assumed that substation 21 is initiating a call. When the subset goes off-hook, a circuit is completed through the substation 21 to allow current to flow between the tip and ring conductors of the line over a path which includes battery 311, contacts of relay 3NG1, resistance 361, normally closed contacts of relay 3TS, conductor NG1, diode 29, terminal X in the subscriber line package 120, diode 228, resistance 229, the ring lead R of the subscriber's line loop through the substation 21, the tip lead T of the subscriber's loop, resistance 230, diode 233, number group return lead NGR to negative battery 312. A similar path may be traced from negative battery 313 over number group lead NG2.

The current which flows in leads NG1 and NG2 forward biases transistors 31 and 32 driving said transistors into the conducting state. The energization of these transistors results in the operation of relays 3NG1 and 3NG2 over similar paths, which for relay 3NG1 may be traced from ground, contacts of relay 3CO, contacts of relay 3NG1, winding of relay 3NG1, resistance 314, diode 315, collector-emitter path of transistor 31, diode 316, contacts of relay 3NG1 to battery 311. On operating, relay 3NG1 locks operated over its normally opened contacts to ground.

Relays 3NG1–A and 3NG2–A now operate over the contacts of relays 3NG1 and 3NG2.

When relay 3NG1 operates, the 34-volt negative potential applied from battery 311 is disconnected by the normally closed contacts of relay 3NG1 in series therewith. Battery 313 is similarly disconnected.

Operation of relay 3NG1 establishes a locking path to battery 350 through the normally closed contacts of relays 4MK1 through 4MK4, contacts of relay 3NG1, resistance 361, resistance 351, base of transistor 31, collector of transistor 31, diode 315, resistance 314, winding of relay 3NG1, contacts of relay 3NG1 to ground.

It will be noted that the contacts of relays 3NG1–A–3NG4–A are connected in series in appropriate codes (which, for purposes of illustration, is the two-out-of-four code) with line relays 3L1–3L*n*. Thus, as a result of the operation of the relays 3NG1–A and 3NG2–A, relay 3L1 is operated over the contacts thereof and the contacts of relay 3LH1.

Relay 3CO is operated over an obvious path including the contacts of relay 3NG1. In operating, the contacts of relay 3CO interrupt the operating ground from the windings of all other relays 3NG–, thereby preventing any other relays 3NG– from operating.

It is significant to note that relay 3L1 is the same line relay which is operated in the No. 1 crossbar system for substation 21 if substation 21 had been directly connected to the central office in lieu of concentration.

In response to the operation of line relay 3L1 the No. 1 crossbar system is operated in the conventional manner as disclosed in FIG. 1A. Thus the line group controller 130 and a sender link controller 131 are energized to select an idle line link, district junctor, sender link and sender and the necessary select and hold magnets to establish the connection are operated.

When the line link primary select magnet 4SEL is operated in the conventional manner (as disclosed in the above-referred-to patents) a trunk mark relay 4MK1 associated with the selected line link 132 is operated in parallel with the select magnet 4SEL. For simplicity, the operation is shown symbolically by actuation of contacts 425 and operation of switch 441 to the right position. Relay 4MK1 locks operated over its normally open contacts and the contacts 415 of relay 4RL. It is to be emphasized again that in accordance with our invention a line link primary select magnet 4SEL is operated for each concentrator subscriber by the central office in the conventional manner, the central office circuitry not being aware that the concentrator subscriber is not, in fact, directly connected to tip and ring verticals by this primary select magnet. Thus each concentrator subscriber's sleeve vertical is individually connected to the sleeve supervision circuitry of the office by the line link switch even though operation of the primary select magnet does not directly connect the vertical tip and ring conductors to the horizontals of the primary switch.

The line hold magnet 4LH1 and horizontal group magnet 4HG1 are also conventionally operated as described in the above-referred-to- Carpenter patents. For simplicity, they are shown here as operated by contacts 451 and 442, respectively.

Operation of relay 4MK1 interrupts the path to minus 34-volt battery 350 and applies ground to leads NG1 and NG2 over a path including ground at 352, contacts of relay 4MK1, contacts of relays 3NG1 and 3NG2, resistances 361 and 353, contacts of relay 3TS to leads NG1 and NG2, respectively. The application of ground potential to the emitter and base of transistors 31 and 32 turns those transistors off. (Conventional holding circuits in the line link frame are not shown to preserve clarity. Reference may be made to the Carpenter patents supra for suitable holding circuits.)

A holding path for relay 3NG1 may now be traced from battery 317, resistance 318, contacts of relay 4MK1, contacts of relay 3NG1, winding of relay 3NG1, contacts of relay 3NG1 to ground. A similar path may be traced for relay 3NG2.

*Marking Number Group Leads*

A ground potential is also applied to number group leads NG1 and NG2 over the contacts 319 of relay 4MK1 and the contacts of relays 3NG1 and 3NG2.

Also a negative potential of minus 78 volts is applied to the ring conductor R of the concentrator trunk 27 over a path including source 49, contacts of relay 3NG1 (and 3NG2), contacts of relay 4MK1, transformer 43, ring conductor of trunk 27 to the ring crosspoints 216, 220 and 224.

A positive potential of 20 volts may be traced from source 410, resistance 411, resistance 412, contacts of relay 4MK1, transformer 43 to the tip conductor T of trunk 28 and to crosspoints 215, 219 and 223.

It may be seen that when the number group leads 1 and 2 were shifted from the standby potential of minus 34 volts (at source 311, etc.) to the mark potential of 0 volt, unique potential conditions were established at crosspoints 215 and 216. Thus the potential at terminal X of line package 120 will be at ground potential in view of the ground potential over diodes 29 and 210 and the ground potential over resistances 235 and 236. Diode 228 isolates terminal X from negative potentials on the loop. Since all other line packages have at least one number group diode connected to a number group lead at minus 34 volts at source 348, the corresponding terminal X (not shown) in those packages will be at substantially minus 34 volts.

The voltage of minus 78 volts applied to the ring conductor as described above appears at terminal 237 of transistor crosspoint 216 and ground potential is applied to conductor 238 of crosspoint 216 to break down the crosspoint over a path including resistances 236, 235, conductor 251 to lead NG2. All other crosspoints (220 and 224) have a total voltage thereacross of substantially 44 volts which is inadequate to break down the crosspoint. In the illustrative transistor crosspoint elements shown, it will be assumed that the crosspoints are operative in response to a triggering voltage of substantially 50 volts. This factor is more graphically apparent from wave form 246 in which the characteristic of the crosspoint is shown.

It is seen from characteristic 246 that for voltages below the breakdown voltage $V_{BD}$, no significant current flow takes place. When the breakdown voltage is exceeded, the sustaining voltage $V_S$ drops to a relatively low value and the crosspoint switches change to a low impedance state.

The voltage is controlled in order to prevent it from falling below the sustaining voltage $V_S$ and the crosspoint is maintained in the low impedance state. The abrupt change of voltage between states generates a negative pulse at the crosspoint 216 which may be traced over to the tip side T of the loop. This path extends through resistance 236 and capacitor 239 to the tip side T of the subscriber's loop. Diode 231 blocks the negative pulse from capacitor 239 and consequently the voltage on the tip side T of the loop at terminal Y is drawn negative to some value approaching minus 70 volts. This voltage is applied to terminal 241 of crosspoint 215. Since it was previously demonstrated that a positive 20-volt signal was applied to the tip conductor of trunk 28, crosspoint 215 is energized and driven to a low impedance state. No other crosspoint elements (219, 223) connected to the tip conductor of the trunk 27 are energized since the terminals Y (not shown) in the corresponding line packages do not experience any voltage excursion. For a detailed description of the operation of suitable crosspoints, reference may be made to Patent 2,655,609 of W. Shockley of October 13, 1953.

It has thus been demonstrated that crosspoints 216 and 215 have been operated to provide balanced connections between the ring conductor of trunk 27 and the ring conductor of substation 21 and between the tip conductor of trunk 27 and the tip conductor of substation 21.

When the transistor crosspoints 215 and 216 have been operated, current from the source 210 flows through resistances 411 and 412 and over the trunk and loop to forward bias transistor 413 thereby operating relay 4CK. Operation of relay 4CK verifies crosspoint closure and causes the operation of relay 4RL over the contacts of relays 4CK and 4MK1, diode 424, conductor 46, and the conventional sleeve ground applied over the line link 132 as explained in the above-mentioned Carpenter patents. Relay 4TH1 has previously operated over the sleeve ground. Transistor 414 is used in the circuit as a current limiting device operative in response to current flow through resistance 412.

Relay 4RL in operating removes the holding ground from relay 4MK1 at contacts 415.

Relay 4MK1 in releasing removes the minus 78-volt potential from the ring conductor by opening its contacts in series with source 49. Similarly the potential from source 410 is interrupted at the contacts of relay 4MK1 connected to diode 419. Current flows from minus 48-volt battery 417 to forward bias transistor 416 and thereby operate relay 4SUP1.

Release of relay 4MK1 as described above also results in the release of relays 3NG1 and 3NG2 in view of the opening of the contacts of relay 4MK1 in series with the holding path thereof to restore the number group circuit to normal.

At this time ground potential is connected to the tip conductor over the contacts of relay 4TH1, resistance 418 and diode 419, and minus 48 volts is applied to the ring conductor R over the contacts of relay 4TH1, resistance 431 and diode 432. This potential is adequate to hold the crosspoints in the conducting state.

Application of the talking voltage causes the number group diodes in the line package to be back-biased thereby isolating trunk 27 from the number group leads with the exception of a path through resistance 235. But since resistance 235 is connected to a balanced point on the loop and since the resistance of the number group lead NG2 to which resistance 235 is connected is small relative to the resistance 235, crosstalk between busy circuits is minimal. On the tip side of the loop diode 233 is back-biased by the hold voltage thereby isolating the number group return lead NGR from the busy circuit.

The resistance-capacitance combination including resistance 229 and capacitor 242 in parallel and resistance 230 and capacitor 240 in parallel in the tip and ring circuits insure that the diodes in the number groups 29 and 210 and diode 233 to the number group return lead NGR will remain back-biased even if a momentary short circuit occurs across the loop terminals of a line package.

*Dialing Operation*

Current now flows over the path through the subset described above and the substation 21 receives dial tone from the subscriber sender 135 in the manner conventionally employed in the No. 1 crossbar system as described above. As is usual a series of pulses or line open conditions is generated during the dialing sequence. Since transistor crosspoints as utilized at crosspoints 215 and 216 require continuous current flow therethrough in the "on" state, provisions must be made to insure continued current flow during the time the dial contacts open the circuit.

This is accomplished by use of Zener diode 243 and resistance 244 across the tip and ring conductors of the loop as shown in FIG. 3. Current continues to flow through the trunk to the central office and the transistor crosspoints 215 and 216 through diode 243 and resistance 244 until the dial contacts again close the circuit. In view of the IR drop across resistances 229 and 230 when the subset is off-hook, no current flows through resistance 244 at that time, the threshold voltage of Zener diode 243 being designed to prevent this condition.

The called party's directory number is registered in the central office in response to the dialed information in the conventional manner of No. 1 crossbar systems whereupon control actions are initiated to effect a connection to the called party.

It will be noted that the dialing signal and other supervisory signals are recognized at the central office by the IR drop across resistance 418 which gates transistor 416 to operate relay 4SUP1. These signals are repeated at the contacts of relay 4SUP1 to open and close the circuit to the line link over conductors 44 and 45.

After the called party is reached, supervision by the No. 1 crossbar office is conventional.

When the subscribers disconnect, the district junctor releases and trunk circuit 27 experiences a battery reversal at the normally closed contacts of relay 4TH1 to insure crosspoint release.

It will now be assumed that an incoming call or terminating call is to be made to a subscriber connected to a concentrator system in accordance with the present invention. For purposes of simplification, it will be assumed that substation 21 is now the called or terminating station.

*Terminating Calls*

When the terminating marker establishes an incoming call to the called line, as discussed above (FIG. 1B), it selects an idle channel through the appropriate crossbar switches to the horizontal group of the line link frame on which the called line appears. The line vertical in the central office unique to substation 21 is operated in a conventional manner to enable circuits described further herein to mark the proper line at the concentrator.

Relay 3TS is operated by the terminating marker at contacts 450 over a path including conductor 420, diode 345, winding of relay 3TS to negative battery. A similar circuit may be traced for the operation of relay 4HG1.

More specifically, the terminating marker after making a directory to equipment number translation extends a ground connection (shown symbolically by operation of contacts 445 and momentary movement of switch 441 to the left position) to operate relay 4SEL on the line link frame. Another ground connection is extended over contacts 446, relay 3TL1, conductor 360, to operate hold magnet 4LH1. It is apparent that the calling subscriber's line is not connected to the vertical path (tip and ring) on the crossbar switch but it is a significant advantage of the instant invention that the office equipment is unaware of the omission of the concentrator substation line and proceeds in the usual manner to effect a connection thereto. In this manner the internal reconstruction of equipment in the No. 1 crossbar office is held to a substantially irreducible minimum.

A polar relay 3TL– is provided for each concentrator line and operates when the marker operates the line hold magnet 4LH–. Thus relays 3TL1 and 4LH1 are operated over the contacts 446 in the marker and conductor 421. Relays 3TL2 and 3TLN corresponding to substations 22 and 23 are also shown although the connection to respective hold magnets are omitted to preserve clarity.

The ground which was extended to operate the line link primary select magnet 4SEL through contacts 445 in the marker circuit also extends over conductor 422 and diode 423 to operate relay 4MK1. Ground on the sleeve circuit S (conventionally applied over the line link 132) operates relay 4TH1 over conductor 46, diode 424 and the winding of relay 4TH1. The terminating marker now releases in accordance with the usual practice.

Operation of relay 3TS transfers the operating path of the number group transistors 31–34 from the number group leads NG1–NG4 to corresponding number group leads in the applique circuit translator over the contacts of relay 3TS.

The operation of relay 3TL1 described above provides a ground potential over diodes 35 and 36 to the transistors 31 and 32 causing those transistors to be forward biased thereby operating relays 3NG1 and 3NG2 in a manner similar to that described above for an originating call. Operation of relay 3NG1 results in the operation of relay 3NG1–A and operation of relay 3NG2 results in the operation of relay 3NG2–A over obvious paths. The contacts of relays 3NG1–A and 3NG2–A in series with relay 3L1 again result in the operation of that relay thereby uniquely designating the selected line.

Corresponding translations over the contacts of relays 3TL2, 3TLN and diodes 37, 38, 39 and 310 are similarly available for substations 22 and 23.

Provisions are now made for marking the appropriate number group leads to energize transistor crosspoints 215 and 216 to connect substation 21 to the selected trunk. The marking operation is accomplished in the manner described above for an originating call by applying a ground potential to the number group leads NG1 and NG2 over the contacts 319 of relay 4MK1 and the contacts of relays 3NG1 and 3NG2. At the same time a minus 78-volt potential from source 49 is applied to the ring conductor of trunk 27 over the contacts of relays 3NG1, 3NG2 and 4MK1 and a plus 20-volt potential to the tip conductor from source 410 over the contacts of relay 4MK1. The resulting potentials at the line package 120 are the same as those experienced in the marking operation for an originating call and transistor crosspoints 215 and 216 are energized in a similar manner.

Here again when the transistor crosspoints 215 and 216 have been operated current from the source 410 flows through resistances 411 and 412 to forward bias transistor 413 thereby operating relay 4CK verifying crosspoint closure. Operation of relay 4CK operates relay 4RL through the closing of the contacts of relay 4CK in series therewith.

Relay 4RL, in operating, releases relay 4MK1 at contacts 415 and relay 3TS releases in view of the opening of the contacts of relay 4RL in series with the holding circuit thereof.

Relay 4MK1 in releasing removes the minus 78-volt potential from the ring conductor by opening contacts in series with source 49. Similarly the potential from source 410 is interrupted at the contacts of relay 4MK1 connected to the tip conductor.

A ringing signal is now applied to actuate the horn "ringer" at substation 21 which may illustratively be a low current subset as described in Patent 2,850,650 of September 2, 1958 of L. A. Meacham.

Illustratively a 1000-cycle ringing tone 453 in series with the conventional 20-cycle ringing tone 452 may be used. The condensers 433 and 434 bridged across the contacts of relay 4SUP1 are designed to offer a high impedance to the 20-cycle tone and a much lower impedance to the 1000-cycle tone. In addition, transformer 43 causes a high transmission loss at 20 cycles and passes 1000 cycles with negligible loss. Consequently the 1000-cycle tone is transmitted over the line to assure proper operation of the ringer at substation 121.

When the called subscriber answers, the subset resistance causes an increase in the hold current which is detected by relay 4SUP1 at the central office as a called subscriber "answer signal" and ringing is discontinued in a well-known manner.

Supervision of the call is thereafter in accordance with usual practice and release of the connection is similar to that described above for an originating call.

As indicated in the general description it is also possible in the present invention to interconnect a plurality of substations by marking the respective concentrator packages to the same speech trunk. Thus the practice to be followed would be in accordance with that described above for marking a single substation to an idle trunk as in conventional practice. With minor appropriate modifications in the applique, apparent to those skilled in the art, marking potentials may be applied to the selected trunk and to the number group leads connected to the desired substation to mark the crosspoints between the substation and the selected trunk. Subsequently another selected substation is marked to the same trunk by applying marking potentials to the appropriate number group leads and to the same trunk. In this manner each of the selected subscribers is sequentially connected to the trunk. Ringing signals may thertafter be applied to the trunk to alert all of the selected subscribers simultaneously. As each subscriber removes his receiver from the switchhook he may converse with the other subscribers over the same speech trunk.

Another alternative provides for the use of "Teletype" receiver units *21a–23a* which are connected in bridge with the substations 21–23, respectively, through switches *21b–23b*. With this arrangtment, at appropriate times, the "Teletype" receiver units may be operated selectively by marking the appropriate crosspoint and closing the respective switch or may be operated collectively by marking a plurality of crosspoints associated with the desired "Teletype" receivers. In the latter event a "broadcast" message may be transmitted from "Teletype" transmitter 340 at the central office by connecting said transmitter to the appropriate trunk, for example trunk 27, over switch 344.

This collective arrangement in which a plurality of receiving units may be connected to the same trunk markedly enhances the flexibility of the instant concentrator arrangement.

It is understood that the foregoing embodiments are merely exemplary and that various modifications may be made by those skilled in the art without departing from the invention.

What is claimed is:

1. In a distributed telephone line concentrator system, a central office; a first plurality of conductors connected to said central office, a second plurality of conductors connected to said central office; a plurality of physically separated remote substations greater in number than said first plurality of conductors; a plurality of remote switching devices individual to said substations and located contiguous to said substations along the longitude of said conductors, said devices including means for connecting said substations to said first plurality of conductors in accordance with a predetermined code and to said second plurality of conductors in response to control signals from said central office over said first plurality of conductors, said devices further including means responsive to a service request condition at one of said substations for energizing selected ones of said first plurality of conductors;

detector means at said central office responsive to said energization of said first plurality of conductors for detecting the energization of said conductors; and means connected to said detector means for indicating the identification of said line requesting service.

2. A distributed telephone line concentrator system including a telephone central office, a first plurality of conductors connected to said office, a second plurality of conductors connected to said office, a plurality of substations greater in number than said conductors, a plurality of individual concentrator units equal in number to said substations and disposed along the longitude of said conductors, said units being physically disposed contiguous to said substations, said units including means for connecting said substations to said first plurality of conductors in accordance with a prearranged code and for connecting said substations to said second plurality of conductors in response to control signals from said central office, a coordinate array of conductors at said central office, the conductors in said array being connectable by contacts at the intersections thereof, means for connecting said second plurality of conductors to individual conductors in said coordinate array, detecting means in said central office for detecting signals applied to said first plurality of conductors, and means for connecting said first plurality of conductors to said detecting means.

3. A distributed line concentrator system including a telephone central office, a plurality of communication trunks and signaling trunks extending remotely from said central office, a plurality of substations remotely located from said central office and remotely located from each other, a plurality of individual concentrator units individual to said substations and physically disposed contiguous to said substations, each unit being located at a relatively lesser distance to its corresponding substation than to any other substation, said units including means for connecting said substations to selected ones of said signaling trunks and for connecting said substations to said communication trunks in response to control impulses from said central office, means at said central office connected to said signaling trunks and responsive to a terminating calling condition to one of said substations for identifying said one substation, and translator means at said central office responsive to said calling condition to one of said substations for energizing selected ones of said signaling trunks in accordance with a prearranged code.

4. A distributed line concentrator system in accordance with claim 3 wherein said last-mentioned means includes a terminating translator, said terminating translator including a plurality of horizontal and vertical conductive paths, impedance means connecting said paths at selected crosspoints thereof, means for coupling said signaling trunks to said horizontal paths, a plurality of conductors individual to said substations, and means for coupling said conductors individual to said substations to said vertical conductive paths.

5. A distributed telephone line concentrator system including a central office, a plurality of speech trunks extending from said office, a plurality of number group conductors extending from said central office, a plurality of substations remotely located from said central office and remotely located from each other, a plurality of remote concentrator switching units individual to said substations and disposed along the longitude of said trunks and conductors, each of said units being physically disposed closer to its individual substation than to any other substation, said units including means for coupling said substations to selected ones of said number group conductors and for coupling said substations to selected ones of said trunks in response to control signals from said central office, and means at said central office responsive to the coupling of one of said substations to one of said trunks to amplify and repeat signaling conditions at said substations.

6. A distributed telephone line concentrator including a central office, a plurality of talking trunks and a plurality of number group leads extending from said central office, a plurality of substations greater in number than said trunks, a plurality of line concentrator units individual to said substations and disposed along the length of said trunks and number group leads, said substations being remotely located from said central office and remotely located from each other, each of said concentrator units being physically located closer to its corresponding substation than to other substations, said units including means for connecting said substations to said number group leads in accordance with a predetermined code and for connecting said substations to said trunks under control of said central office, detector means at said central office responsive to the energization of said number group leads at said concentrator units for identifying a substation in a signaling condition, terminating translator means at said central office for energizing said number group leads in response to a calling condition to one of said substations to initiate connection of said called substation to one of said trunks, and transfer means for alternatively coupling said number group leads to said detector means and said translator means.

7. A distributed telephone line concentrator including a telephone central office, a first and second plurality of trunks extending from said central office, a plurality of substations remotely located from said central office and from each other, a plurality of individual remote concentrator units of said substations, each of said units being physically disposed more proximate to its respective substation than to other substations, said units being disposed along the extension of said trunks and including means for connecting said substations to said first plurality of trunks in accordance with a predetermined code and to said second plurality of trunks in accordance with control signals from said central office, detector means at said central office responsive to a signaling condition at one of said substations over said first plurality of trunks for identifying said substation, and additional means at said central office responsive to the operation of said detector means for coupling said substation to one of said second plurality of trunks including means for applying marking potentials to said one of said second trunks and to selected ones of said first plurality of trunks indicative of said one substation.

8. A distributed telephone line concentrator system in accordance with claim 7 including in addition means at said central office responsive to the connection of said substation to said selected one trunk to indicate the establishment of said connection.

9. A distributed telephone line concentrator system including a telephone central office, a plurality of number group leads and speech trunks connected to said central office, a plurality of substations greater in number than said trunks remotely located from said office and from each other, a plurality of remote concentrator units individual to said substations and each located in greater contiguity to its individual substation than to other substations, said units including means for connecting substations to said number group leads in accordance with a prearranged a code and for connecting said substations to said speech trunks in response to control signals from said central office, means at said central office including a plurality of horizontal and vertical conductive paths, crosspoint contacts at the intersection of said paths, means for coupling said speech trunks to said horizontal conductive paths, means in said central office responsive to a terminating calling condition to one of said substations to extend a connection to said substation including means for energizing the crosspoint contacts at the intersection of the horizontal path coupled to a selected trunk and a vertical path individual to said called substation, means responsive to the operation of said crosspoint contacts for selecting particular number group leads coupled to said vertical path, and circuit holding means connectable to said vertical conductive path.

10. A distributed telephone line concentrator system in accordance with claim 9 including marking means connectable to said horizontal conductive path and to said selected number group leads to control said remote concentrator unit to effect a connection between said called substation and said selected trunk.

11. A distributed telephone line concentrator system in accordance with claim 10 including in addition means responsive to the connection of said called substation to one of said trunks to initiate a ringing condition at said substation including means for transmitting a composite two-frequency signal over said horizontal conductive path connected to said selected trunk, and means intermediate said horizontal path and said trunk for suppressing one of said ringing frequency signals.

12. A distributed telephone line concentrator system including a central office, a coordinate array of conductors at said central office including horizontal and vertical conductive paths, said horizontal conductive paths including tip and ring conductors, said vertical conductive paths including a sleeve conductor, a plurality of remotely extending speech trunks connected to said tip and ring conductors of said horizontal conductive paths, a plurality of number group leads remotely extending from said central office, a plurality of substations remotely located from said central office and remotely located from each other, a plurality of remote concentrator switching units individual to said substations and physically disposed contiguous to said substations, said units including means for connecting said substations to said number group leads in accordance with a predetermined code and for connecting said substations to said trunks in response to control signals from said central office, and means at said central office coupled to said sleeve conductor in said vertical conductive path for energizing said number group leads.

13. A distributed telephone line concentrator system including a telephone central office, a coordinate array of conductors at said central office, said array including a plurality of horizontal and vertical conductive paths, said horizontal conductive paths including tip and ring conductors, said vertical conductive paths including a sleeve conductor, a plurality of remotely extending communication trunks connected to the tip and ring conductors of said horizontal conductive paths, detector means at said central office, a plurality of remotely extending number group leads connected to said detector means, a plurality of individual concentrator units remotely located from said central office and remotely located from each other, a plurality of substations individually connected to said units, said substations being closer in proximity to said individual units than to each other, said units including means for coupling said substations to said number group leads in accordance with a predetermined code and for coupling said substations to said communication trunks in response to control signals from said central office, means at said units responsive to an off-hook condition at said substations for energizing selected ones of said number group leads, a plurality of number group relays at said central office individual to said number group leads, said detector means being responsive to the energization of said number group leads for operating said number group relays, and a plurality of line relays individual to said substations at said central office and responsive to the energization of particular combinations of said number group relays.

14. A distributed telephone line concentrator system in accordance with claim 13 including in addition a diode translator at said office responsive to a terminating calling condition to one of said substations to energize selected ones of said number group leads to effectuate a connection between said called substation and a selected one of said communication trunks.

15. A distributed telephone line concentrator system in accordance with claim 13 including in addition means for applying marking potential to selected ones of said number group leads and for applying marking potential to said ring conductor of a selected trunk to effectuate a connection in said concentrator unit between said substation and said ring conductor of said trunk, and means in said concentrator unit responsive to the connection of said ring conductor to said substation to effectuate a connection between said tip conductor of said trunk and said substation.

16. A distributed telephone line concentrator system in accordance with claim 15 including in addition supervisory relay means at said central office responsive to a connection of one of said substations to a selected trunk to monitor supervisory and dialing signals from said substation.

17. A distributed telephone line concentrator system in accordance with claim 15 including in addition means responsive to a signaling condition at said substation for reversing the polarity of potentials applied to said tip and ring conductors of said selected trunk to release the connection at said remote concentrator unit between said substation and said selected trunk.

18. A distributed telephone line concentrator system including a central office, a coordinate array of conductors at said central office including vertical and horizontal conductive paths and crosspoint contacts at the intersection of said paths, a plurality of number group leads extending from said office, a plurality of speech trunks extending from said office, a greater plurality of remote substations, said horizontal conductive paths including tip and ring conductors, said vertical conductive paths including a sleeve conductor individual to said substations, said speech trunks having tip and ring conductors connected to corresponding conductors in said horizontal conductive paths, a plurality of substations remotely located from said central office and remotely located from each other, said substations being greater in number than said trunks, a plurality of remote concentrator units individual to said substations, each of said units being physically disposed in closer proximity to its individual substation than to other substations, transistor detector means at said central office connectable to said number group leads, rectifier translator means at said central office connectable to said number group leads, said concentrator units including means for connecting said substations to said number group leads in accordance with a predetermined code and means for connecting said substations to said speech trunks under control of said central office, means at said central office responsive to an off-hook condition at a calling one of said substations for energizing said detector means over said number group leads to indicate the identity of said calling substation, means responsive to the energization of said detector means for effectuating a connection between said calling substation and one of said trunks, means at said central office responsive to a terminating call to a called one of said substations for connecting said translator means to said number group leads to energize a selected plurality of number group leads unique to said called substation and to effectuate a connection to said called substation over a selected one of said trunks to said central office, and means for operating said crosspoint contact in said coordinate array at the intersection of said sleeve conductor representing said called substation and said horizontal path connected to said selected trunk.

19. A distributed telephone line concentrator system including a central office, a coordinate array of conductors at said central office including a plurality of horizontal and vertical conductive paths, crosspoint contacts at the intersection of said paths, said horizontal paths including tip and ring conductors, said vertical paths including a sleeve conductor, a plurality of remotely extending speech trunks connected to said tip and ring conductors, a plurality of remotely extending number group leads connected to said central office, a plurality of substations greater in number than said trunks and remotely located from said central office and from each other, a plurality of remote concentrator units individual to said substations, each of said units being located at a relatively lesser distance from its individual substation than from other substations, said units including means for connecting said substations to said number group leads and for connecting said substations to said speech trunks under control of said central office, said sleeve conductors in said vertical paths being individually representative of said substations, said sleeve conductors in said horizontal conductive paths being individually representative of said speech trunks, means responsive to an off-hook condition at a calling one of said substations for energizing said number group leads, means at said central office responsive to said energization for controlling said coordinate array to close the crosspoint contacts at the intersection of the horizontal conductive path connected to a selected trunk conductor and the vertical conductive path representative of said calling substation, and means responsive to said last-mentioned means for energizing said number group leads and for applying a marking potential to said selected trunk to effectuate a connection in said remote concentrator unit individual to said calling substation between said calling substation and said selected trunk.

20. A distributed telephone line concentrator system in accordance with claim 19 including in addition means at said central office responsive to a terminating call to a called one of said substations for operating said crosspoint contacts between said vertical path representative of said called substation and the horizontal path representative of a selected one of said trunks, and means responsive to said last-mentioned means for energizing said number group leads and for applying marking potential to said selected trunk to effectuate a connection at said remote concentrator unit between said called substation and said selected trunk.

21. A distributed telephone line concentrator system including a telephone central office, a first plurality of conductors connected to said office, a second plurality of conductors connected to said office, a plurality of private-line substations greater in number than said conductors, a plurality of individual concentrator units equal in number to said substations and disposed along the longitude of said conductors, said units being physically disposed contiguous to said substations, said units including means for connecting said substations to aid first plurality of conductors in accordance with a predetermined code and for connecting said substations to said second plurality of conductors in response to control signals from said central office, and means at said central office for connecting a plurality of substations to the same conductors in said second plurality of conductors simultaneously to provide voice communication therebetween.

22. A distributed telephone line concentrator system including a telephone central office, a plurality of speech trunks extending from said office, a plurality of number group conductors extending from said office, a plurality of independent substations greater in number than said trunks, a plurality of line concentrator units individual to said substations and disposed along the longitude of said trunks and number group conductors, said units including means for connecting said substations to said number group conductors in accordance with a predetermined code and for connecting said substations to said trunks under control of said central office, and means at said central office for connecting a plurality of said substations to the same speech trunk simultaneously to provide a voice commmunication path from said central office to said plurality of substations.

23. A distributed telephone line concentrator system including a central office, a plurality of communication trunks and a plurality of signaling trunks extending from said central office, a plurality of private-line substations greater in number than said trunks, a plurality of line concentrator units individual to said substations and disposed along the longitude of said trunks, said substations being remotely located from said central office, each of said units being physically located contiguous to its corresponding substation, said units including means for connecting said substations to said signaling trunks in accordance with a predetermined code and for connecting said substations to said trunks under control of said central office, and means at said central office for connecting a plurality of said substations to the same communication trunk to provide a code signaling path from said central office to said plurality of substations simultaneously.

24. A distributed telephone line concentrator system in accordance with claim 23 including in addition code receivers at said substations for receiving transmitted code signals.

25. A distributed telephone line concentrator system including a telephone central office, a plurality of number group conductors and a plurality of speech trunks remotely extending from said central office, a plurality of private-line substations greater in number than said trunks remotely located from said office and from each other, a plurality of remote concentrator units individually contiguous to said substations and physically distributed along the longitude of said trunks and number group conductors, said units including switching means connecting said substations to said number group conductors in accordance with a predetermined code, means under control of said central office for connecting said substations to selected ones of said speech trunks, and means at said central office for sequentially energizing said number group conductors and a selected one of said speech trunks to actuate said switching means at a plurality of remote units to establish a connection between a plurality of substations associated with said remote units and said selected trunk.

References Cited in the file of this patent

UNITED STATES PATENTS

| | | |
|---|---|---|
| 2,717,925 | Lomax | Sept. 13, 1955 |
| 2,837,602 | Lundkvist | June 3, 1958 |
| 2,863,949 | Lomax | Dec. 9, 1958 |
| 2,979,571 | Libois et al. | Apr. 11, 1961 |